United States Patent
Ohta et al.

(10) Patent No.: US 8,461,808 B2
(45) Date of Patent: Jun. 11, 2013

(54) DC-DC CONVERTER AND VOLTAGE DETECTOR USING SAME

(75) Inventors: Takayuki Ohta, Tochigi (JP); Masanori Kawamoto, Tochigi (JP); Toshiaki Ariyoshi, Wako (JP)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 475 days.

(21) Appl. No.: 12/389,964

(22) Filed: Feb. 20, 2009

(65) Prior Publication Data

US 2009/0212761 A1    Aug. 27, 2009

(30) Foreign Application Priority Data

Feb. 21, 2008    (JP) .................................. 2008-039915

(51) Int. Cl.
    *H02J 7/04*    (2006.01)
(52) U.S. Cl.
    USPC ......................................................... 320/140
(58) Field of Classification Search
    USPC ........................................................ 320/103
    See application file for complete search history.

(56) References Cited

U.S. PATENT DOCUMENTS

| | | | |
|---|---|---|---|
| 5,570,276 A * | 10/1996 | Cuk et al. | 363/16 |
| 6,208,148 B1 * | 3/2001 | Yuen | 324/433 |
| 6,879,501 B2 * | 4/2005 | Mori | 363/56.03 |
| 6,909,915 B2 * | 6/2005 | Greatbatch et al. | 320/103 |

FOREIGN PATENT DOCUMENTS

| | | |
|---|---|---|
| JP | 5-219733 A | 8/1993 |
| JP | 2002-325435 A | 11/2002 |
| JP | 2006-153758 A | 6/2006 |
| JP | 2007-116890 A | 5/2007 |
| JP | 2007-285714 A | 11/2007 |

OTHER PUBLICATIONS

Japanese Office Action mailed Apr. 24, 2012, issued in corresponding Japanese Patent Application No. 2008-039915, (3 pages).

* cited by examiner

*Primary Examiner* — Edward Tso
*Assistant Examiner* — Robert Grant
(74) *Attorney, Agent, or Firm* — Westerman, Hattori, Daniels & Adrian, LLP

(57) ABSTRACT

A DC-DC converter includes: a transformer including primary and secondary windings; a switching element that drives the primary winding; a comparator that compares a voltage induced in the secondary winding with a predetermined voltage to detect that the voltage is outside a predetermined voltage range; and a controller. The controller stops switching operation of the switching element when the voltage is outside the predetermined voltage range. Preferably, the DC-DC converter is of a flyback system.

9 Claims, 4 Drawing Sheets

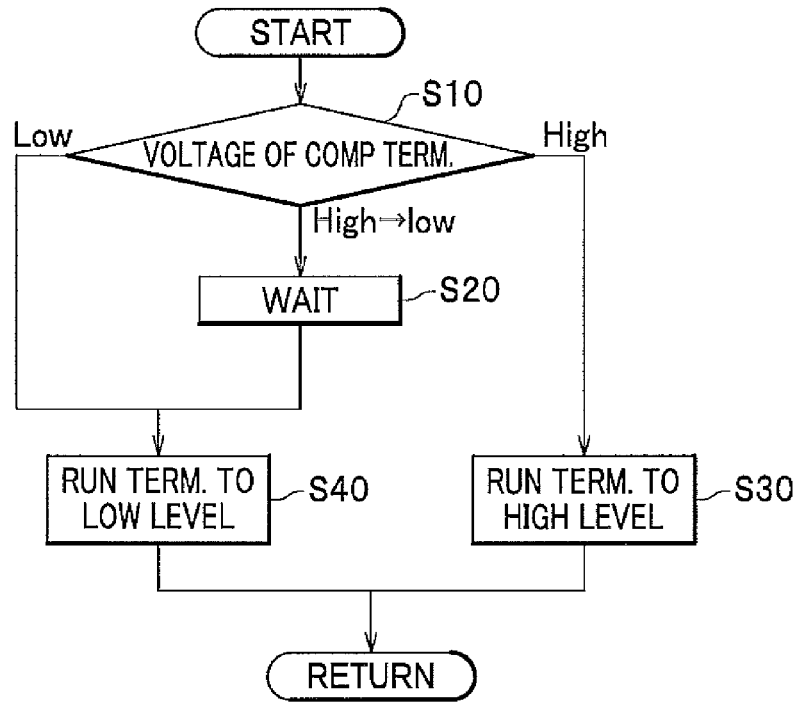
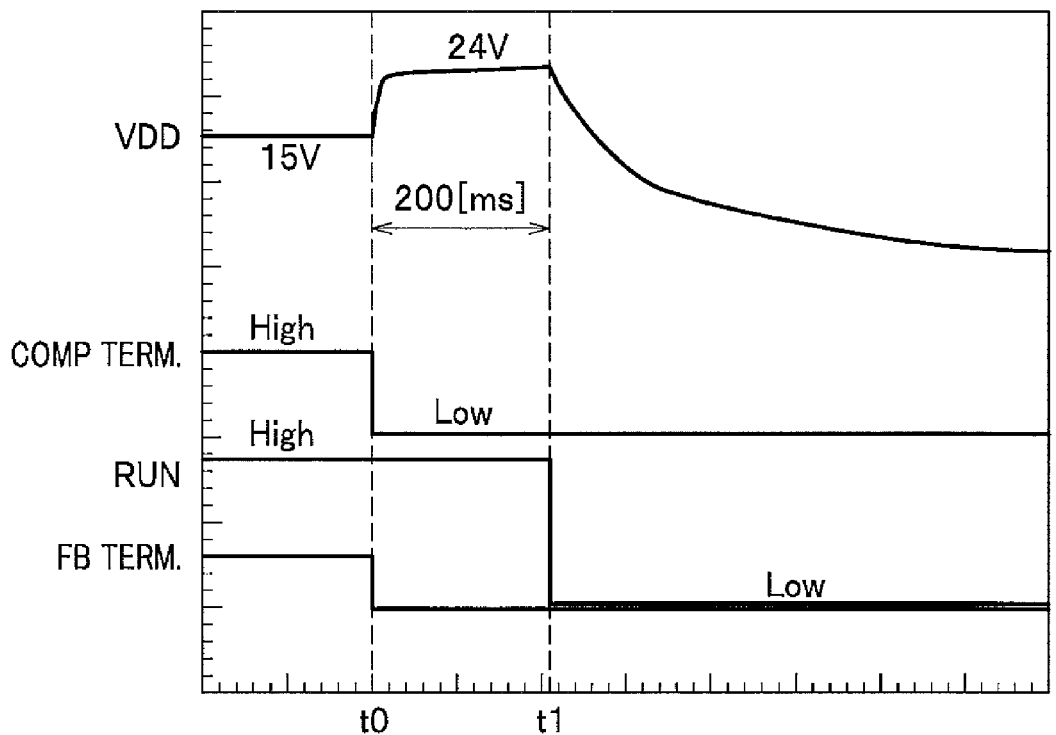

DC-DC CONVERTER AND VOLTAGE DETECTOR USING SAME

CROSS REFERENCE TO RELATED APPLICATIONS

This application claims the foreign priority benefit under Title 35, United States Code, §119(a)-(d) of Japanese Patent Application No. 2008-39915, filed on Feb. 21, 2008 in the Japan Patent Office, the disclosure of which is herein incorporated by reference in its entirety.

BACKGROUND OF THE INVENTION

1. Field of the Invention

The present invention relates to a DC-DC converter and a voltage detector and particularly to a DC-DC converter for controlling a voltage induced at a secondary winding within a predetermined range and a voltage detector for measuring a voltage of a battery module using the DC-DC converter.

2. Description of the Related Art

In electric vehicles, hybrid vehicles, and fuel cell vehicles, motors are driven by a battery pack including a plurality of battery modules connected in series, each battery module including a plurality of cells. A voltage detector always monitors a voltage of each battery module, and a control unit performs a control to reduce dispersion in charging caused by deterioration in the battery modules.

A method of detecting voltages of battery modules is known in which one of photo-MOS switches selects one of battery modules to be measured, the voltage of the battery module is charged in a capacitor, and a voltage difference across both terminals of the capacitor is detected with an A/D converter.

JP 2006-153758 A discloses a technology in which the battery module voltage and a voltage having a value outside a voltage range where a battery modules possibly outputs are alternately applied to a capacitor by alternately switching the photo MOS switch and another semiconductor switch. A junction state, such as a status whether the battery module is disconnected from a measuring circuit, is determined on the basis of detection of variation in a voltage charged in the capacitor.

JP 2007-285714 A discloses a technology in which a variable resistor is connected to a photo-MOS switch, and a charging voltage is varied during switching of the photo-MOS switch. The junction status, such as a status whether the battery module is disconnected from the measuring circuit, is determined by determining whether an error occurs in time constant of charging voltage.

SUMMARY OF THE INVENTION

A first aspect of the present invention provides a DC-DC converter comprising: a transformer including primary and secondary windings; a switching element that drives the primary winding; a comparator that compares a voltage induced in the secondary winding with a predetermined voltage to detect that the voltage is outside a predetermined voltage range; and a controller that stops switching operation of the switching element when the voltage is outside the predetermined voltage range.

With this structure, if the voltage induced in the secondary winding is outside the predetermined range, it may be prevented that a high voltage is induced in the secondary winding because the switching operation is stopped. Accordingly, the secondary circuit is protected from high voltages.

A second aspect of the present invention provides a DC-DC converter based on the first aspect, wherein the secondary windings comprise a feedback winding generating a voltage proportional to voltages induced in the secondary windings, the DC-DC converter further comprising a feedback circuit comprising a rectifier connected to the feedback winding to rectify the voltage induced in the secondary winding; wherein the controller stops switching operation of the switching element when the rectified voltage is not greater than the predetermined voltage.

This structure may eliminate necessity of further providing a secondary side voltage detector supplied with a power from the secondary side because the insulated feedback winding can detect a voltage proportional to the secondary voltage as a feedback voltage, which is used for detecting an error voltage.

A third aspect of the present invention provides a DC-DC converter based on the first aspect, further comprising a rectifying circuit that rectifies a voltage induced in the secondary circuit and a secondary voltage detector that is driven by the induced voltage and detects the rectified voltage, wherein the controller stops switching operation of the switching element after a predetermined time interval elapses from when the rectified voltage is not smaller than a predetermined voltage.

With this structure, the secondary voltage detector can be provided within the circuit operating with the secondary voltage.

When the receiving circuit cannot receive the signal for a predetermined time interval, the controller can stop driving the switching element.

Further, preferably, winding directions of the coils and an output circuit of the secondary winding are made so as to form a flyback circuit. The flyback circuit may have such a characteristic that when an output current becomes low which may be caused by disconnection of an output terminal, an output voltage may become extremely high. However, when the output voltage is outside the predetermined voltage range, the switching operation is stopped. This may protect the secondary side circuit.

A fourth aspect of the present invention provides a voltage detecting apparatus comprising: a high voltage battery including a plurality of battery cells connected in series, which are grouped into modules each including a predetermined number of the cells; a battery voltage detecting unit that detects voltages of the modules and transmits a signal indicating the detected voltages; a signal processing unit that is supplied with electric power from a low voltage battery and processes the signal; a DC-DC converter that boosts up a voltage of the low voltage battery to apply the boosted voltage to the battery voltage detecting unit, the DC-DC converter further comprising a transformer including a feedback winding generating a voltage proportional to a secondary winding voltage in magnitude; a detector comprises a comparator that compares the generated voltage with a threshold voltage to detect an error in the voltage detecting apparatus; and a controller that stops operation of the DC-DC converter when the detector that detects the error.

Upon an error condition, this structure may stop the DC-DC converter from operating upon, which stops the DC-DC converter from supplying a DC power to the battery voltage detecting unit. This protects the voltage detector from error in voltage.

BRIEF DESCRIPTION OF THE DRAWINGS

The object and features of the present invention will become more readily apparent from the following detailed description taken in conjunction with the accompanying drawings in which:

FIG. 3 is a flowchart of a primary side CPU according to the embodiment;

FIG. 4 is a time chart of voltage waveforms at respective terminals of the DC-DC converter.

The same or corresponding elements or parts are designated with like references throughout the drawings.

DETAILED DESCRIPTION OF THE INVENTION

Prior to describing an embodiment of the present invention, the above-mentioned related art will be further explained.

The measuring circuits in JP 2006-153758 A and JP 2007-285714 A detect contact status as to disconnection between the battery module and the measuring circuit, but cannot detect an error in the secondary side voltage of the power supply circuit for driving the voltage detector.

An amplitude value of a secondary side rectangular waveform voltage is generally set to a value larger than a secondary side rated voltage, and the power supply circuit performs a feedback control by a PWM control on the secondary side rectangular waveform voltage so that an average voltage approaches the secondary side rated voltage. This structure may cause that the secondary side average voltage largely exceeds the secondary side rated voltage because of an error such as short circuit in a feedback circuit for detecting a secondary side rectangular wave voltage and feeding back the detected voltage to the primary side.

Further, if a flyback circuit is used in the power supply circuit, and thus a load current decreases due to a disconnection in a line and a poor contact in a terminal, the power supply circuit may generate a high voltage on the secondary side.

The present invention provides a DC-DC converter capable of protecting the circuit from a voltage outside a predetermined range of a secondary winding, and a voltage detecting device using the DC-DC converter.

The present invention may protect a circuit board from a voltage outside a predetermined voltage.

First Embodiment

Figure 1:
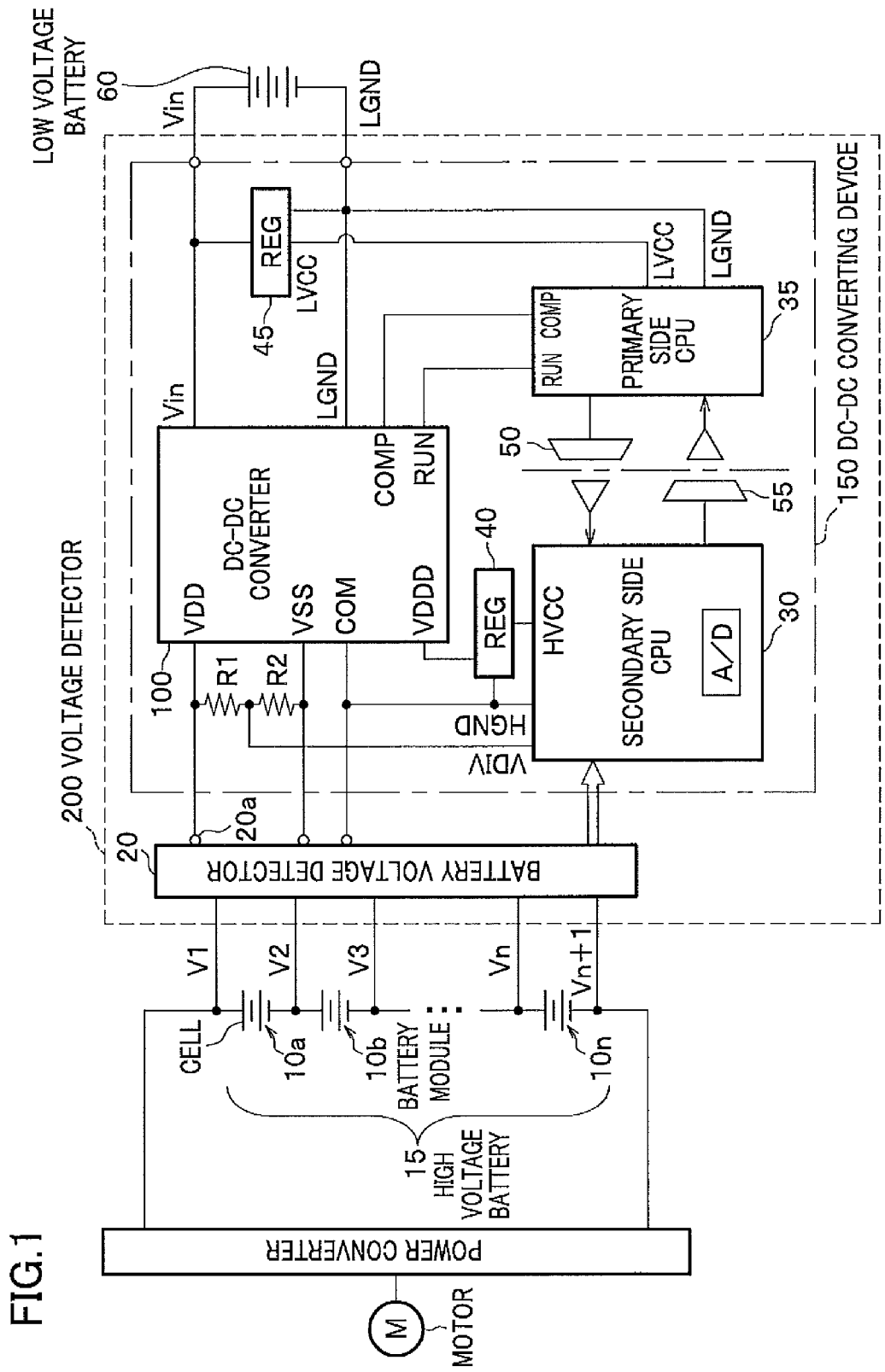
FIG. 1 is a block diagram of a voltage detector according to first and second embodiments of the present invention.

With reference to FIG. 1 will be described a voltage detector according to a first embodiment.

A voltage detector 200 includes a battery voltage detector 20 for detecting voltages (V1-V2), (V2-V3), - - - (Vn-V(n+1)) of a plurality of battery modules 10 (10a, 10b, - - -, and 10n) and a DC-DC converting device 150 for supplying a DC power to a battery voltage detector 20, driven by a low voltage battery 60.

The DC-DC converting device 150 includes a DC-DC converter 100, a secondary side CPU 30 for processing voltages detected by the battery voltage detector 20, a primary side CPU 35 for controlling start-up and operation of the DC-DC converter, serial transmitters 50 and 55 for serial transmitting between the primary side CPU 35 and the secondary side CPU 30 with electrical isolation, and a voltage regulators (REG) 40 and 45 for supplying DC powers to the secondary side CPU 30 and the primary side CPU 35, respectively. A control part is formed with a control circuit 80 (see FIG. 2) in the DC-DC converter 100, the secondary side CPU 30, and the primary side CPU 35. The serial transmitters 50 and 55 provide transmission paths with photo-couplers.

A high voltage battery 15 is a battery pack including battery modules 10a, 10b, - - -, and 10n connected in series, each including a plurality of cells connected in series, for driving a motor through a power converter. In other words, the battery modules 10a, 10b, - - -, 10n are such that the high voltage battery 15 is divided into plural parts. The voltage of the high voltage battery 15 is high. This allows the current to be small, which allows a cable for connecting the high voltage battery 15 and the motor to be thin with a light weight. The cells forming the battery modules 10a, 10b, - - -, and 10n are fuel cells, secondary cells, or the like.

The battery voltage detector 20 detects voltages (V1-V2), (V2-V3), - - -, and (Vn-V(n+1)) to detect dispersion in characteristic of the battery modules 10 due to deterioration or the like of the battery modules 10.

The DC-DC converter 100 is supplied with a DC power from the low voltage battery 60 through a Vin terminal to perform a PWM control so that a feedback voltage (the secondary voltage fed back) becomes near to a target voltage to generate DC voltages $V_{DD}$, $V_{SS}$ ($=-V_{DD}$), and a DC voltage at the VDDD terminal with respect to a COM terminal. Because of a demand for down-sizing, the DC-DC converter 100 adopts a flyback circuit without a choke coil on the secondary side. Thus, if it is assumed that a load current on the secondary side is $I_{DC}$, an inductance on the primary side is L, and the voltage of the low voltage battery 60 is V1, an output voltage $V_O$ (terminal voltage $V_{DD}$, $V_{SS}$ or $V_{DDD}$) is given by:

$$V_O = (V_1 T_{ON})^2 / \{(2LI_{DC})(T_{ON}+T_{OFF})\} \quad (1)$$

The output voltage $V_O$ depends on the load current $I_{DC}$ in addition to the a duty ratio of the PWM control signal $T_{ON}/(T_{ON}+T_{OFF})$. In other words, the DC-DC converter 100 has such a characteristic that a high voltage is generated when the load current $I_{DC}$ is low. Since there is a limit in shortening a pulse width $T_{ON}$, the DC-DC converter 100 tends to be difficult in controlling the output voltage $V_O$, and has limit in PWM control. For example, in a case where a terminal 20a for connecting the DC-DC converter 100 and the battery voltage detector 20 is disconnected, the load current $I_{DC}$ becomes approximately zero, so that the output voltage $V_O$ becomes extremely high.

The DC-DC converter 100 has a RUN terminal for stopping switching operation on the primary side. In the first embodiment, the primary side driving (switching operation) is stopped when an error is detected in the output voltage $V_O$. Further, the DC-DC converter 100 is provided with a COMP terminal to detect an error in the feedback voltage $V_{FB}$ from the secondary side to the primary side.

The secondary side CPU 30 A/D-converts analog signals of voltage (V1-V2), (V2-V3), - - -, and (Vn-V(n+1)) detected by the battery voltage detector 20 into digital signals which are serially transmitted to the primary side CPU 35. Further, the secondary side CPU 30 monitors at a VDIV terminal a value of the voltage $V_{DIV}$ obtained by dividing a voltage difference between the output terminals VDD and VSS with resistors R1 and R2 and the value of the voltage $V_{DIV}$ is serially transmitted to the primary side CPU 35. In other words, the resistors R1 and R2, and the secondary side CPU 30 serves as a secondary voltage detecting part.

The primary side CPU 35 serially receives the value of the voltage $V_{DIV}$ transmitted by the secondary side CPU 30 and determines whether the received value is greater than a predetermined value. Further, when the value is determined to be greater than the predetermined value and thus to be error, the primary side CPU 35 inverts a logic level of the RUN terminal of the DC-DC converter 100 to stop switching operation. Further, when the reception signal from the serial transceiver 55 ceases for a predetermined time interval, the primary side CPU 35 determines that there is an error and stops the switching operation. The secondary side CPU 30 has a HGND terminal which is connected to the COM terminal on the secondary side of the DC-DC converter 100. The primary side CPU 35 has a LGND terminal which is connected to a LGND terminal on the primary side of the DC-DC converter 100. The HGND terminal and the LGND terminal are electrically isolated from each other.

The serial transmitters 50 and 55 are provided to serially transmit digital signals between the primary side CPU 35 and the secondary side CPU 30 with electrical isolation. The serial transmitter 50 transmits the digital signal from the primary side CPU 35 to the secondary side CPU 30 to control functions of the secondary side CPU 30.

The voltage regulator 40 is a power supply of which output voltage is regulated to supply a DC power to the secondary side CPU 30 using an output at the terminal VDDD of the DC-DC converter 100. The voltage regulator 45 is a power supply of which output voltage is regulated to supply a DC power to the primary side CPU 35 using the low voltage battery 60.

Figure 2:
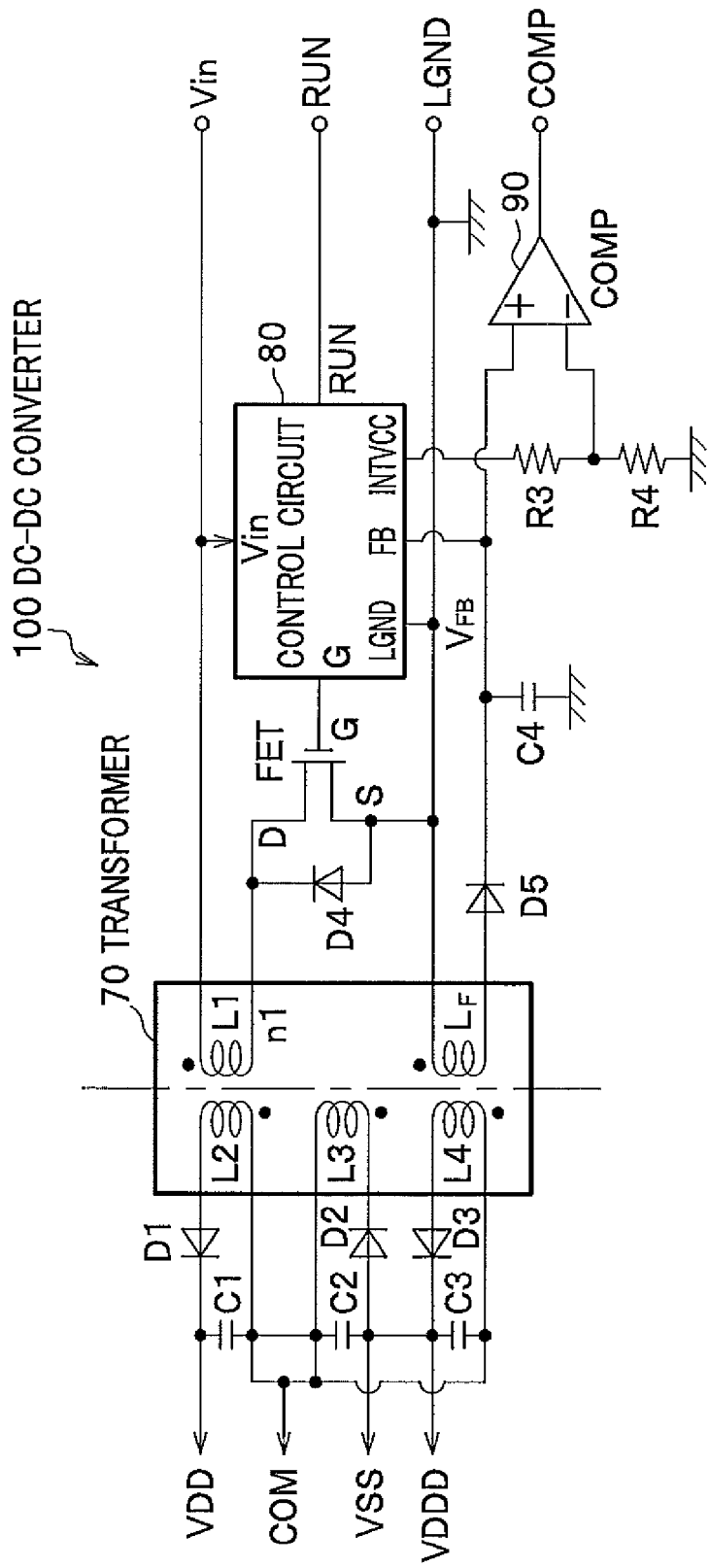
FIG. 2 is a schematic circuit diagram of a DC-DC converter used in the voltage detector shown in FIG. 1.

With reference to FIG. 2, will be described internal circuitry of the DC-DC converter 100.

The DC-DC converter 100 includes a control circuit 80, a transformer 70, an FET (field effect transistor), a comparator 90, a plurality of diodes D1, D2, D3, D4, and D5, and a plurality of capacitors C1, C2, C3, and C4.

The transformer 70 includes three secondary windings L2, L3, and L4, a primary winding L1, and a feedback winding $L_F$ which are wound around a magnetic material core with electrical insulation. The primary winding L1 has the number of turns which is n1, one end of which is connected to the power supply terminal Vin, the other end of which is connected to a drain of the FET. Reversely connected between the drain and source of the FET is the diode D4 to protect the FET.

The secondary winding L2 has the number of turns which is n2, one end of which is connected to an anode of the diode D1. Connected between a cathode of the diode D1 and the other end of the secondary winding L2 is the capacitor C1.

The secondary winding L3 has the number of turns which is n3 (=n2), one end of which is connected to a cathode of the diode D2. Connected between an anode of the diode D1 and the other end of the secondary winding L3 is the capacitor C2.

The secondary winding L4 has the number of turns which is n4, one end of which is connected to an anode of the diode D3. Connected between a cathode of the diode D3 and the other end of the secondary winding L4 is the capacitor C3.

The other ends of the secondary windings L2, L3, and L4 are connected to each other at the COM terminal. An output of the cathode of the diode D1 is connected to be outputted at the VDD terminal. The anode of the diode D2 is connected to the VSS terminal to output a signal at the other end of the secondary winding L3. Further, the cathode of the diode D3 is outputted at the VDDD terminal.

In the transformer 70, a Vin terminal side of the primary winding L1 and a COM terminal side of the secondary winding are oppositely wound. The Vin terminal side of the primary winding L1 and a cathode side of the secondary winding L3 are oppositely wound. Accordingly, the secondary windings L2, L3, and L4 generate voltage opposite to the voltage applied to the primary winding L1. The control circuit 80 has power supply terminals of Vin and LGND, a G terminal for applying the PWM signal to a gate terminal of the FET, an FB terminal for receiving a feedback voltage $V_{FB}$ proportional to the secondary side voltage, an INTVcc terminal for outputting an internal voltage obtained by regulating the power supply at the Vin thermal down to a lower voltage, and the RUN terminal for resetting the signal voltage at the G terminal to zero voltage to stop the switching operation.

One end of the feedback winding $L_F$ is connected to the LGND terminal and the other end is connected to anode of the diode D5 of which cathode is connected to the FB terminal. One end of the capacitor C4 is grounded on the LGND terminal, and the FB terminal is connected to the other end of the capacitor C4 to hold a peak value of a rectified voltage of the feedback winding $L_F$ (a feedback voltage $V_{FB}$).

Further the DC-DC converter 100 includes a comparator 90 having a non-inverting input connected to the FB terminal of the control circuit 80 and an inverting input connected to a joint between resistors R3 and R4 of a series circuit for dividing a voltage of the INTVcc terminal. An output signal of the comparator 90 is outputted at the COMP terminal. The comparator 90 detects an error in the feedback voltage $V_{FB}$.

Operation of DC-DC Converter

Prior to describing the total operation of the voltage detector 200, will be described an operation of the flyback type DC-DC converter 100.

In FIG. 2, when the G terminal becomes a High level, the FET turns on, which applies the voltage of the Vin terminal (the voltage V1 of the low voltage battery 60) between both ends of the primary winding L1, so that a primary current i1 linearly increases. In the event, no currents flow in the secondary windings L2, L3, and L4 because the diodes D1, D2, and D3 are reversely connected. After a time interval $T_{ON}$ elapses, when the control circuit 80 turns off the FET, a magnetic energy of $(1/2)L(T_{ON}\cdot V_1/L)^2$ stored in the primary winding L1 is all transferred to the secondary windings L2, L3, and L4. In other words, the secondary voltage is generated in the reverse direction, so that a secondary current flows through the diodes D1, D2, and D3 to charge the capacitors C1, C2, and C3.

In this event, initial values of the secondary currents i1, i2, and i3 satisfy the following equation where a value of the primary current during turn-off of the FET is I1 and an interlinkage magnetic flux is $\Phi$.

$$\Phi = L1\cdot I1 = L2\cdot I2 + L3\cdot I3 + L4\cdot I4$$

The currents are load currents and charging currents of the capacitors C1, C2, and C3.

Since the secondary windings L2, L3, and L4, and feedback winding $L_F$ interlink with the same magnetic flux, the induced voltages and the feedback voltage $V_{FB}$ are given by dividing by a turn ratio of n2/n1, n3/n1, n4/n1, and nF/n1. Accordingly, the induced voltage on the feedback winding $L_F$ is proportional to induced voltages of the secondary windings L2, L3, and L4.

Charging voltages (output voltages) of the capacitors C1, C2, and C3 during a normal operation while turning on and off is repeated is determined by a relation between a magnetic energy stored in the primary winding L1 and transferred to the secondary windings L2, L3, and L4 and a discharged electric power (load power). When the discharged electric power is low, the secondary side voltages become high. Particularly, when the discharged electric power (discharged current) is zero, an infinite magnitude of the secondary side voltage (flyback voltage) is generated.

Further, a peak of the voltage induced in the feedback winding $L_F$ is held by the capacitor C3 after rectification by the diode D5. The held voltage is applied to the FB terminal as the feedback voltage $V_{FB}$. The control circuit 80 generates a PWM control signal at the G terminal so that the feedback voltage $V_{FB}$ becomes near a set value. This provides control so as to make the secondary voltage near a rating voltage.

With reference to FIG. 1, will be described a total operation of the voltage detector 200.

If the terminals are correctly connected between the DC-DC converter 100 and the voltage detector 20, the secondary side voltage does not become too high because the secondary side currents flow in the DC-DC converter 100 at predetermined magnitudes, so that a rated voltage of +15 V is outputted at the VDD terminal. However, in a case of no load status because the terminals are imperfectly connected between the DC-DC converter 100 and the voltage detector 20, or in a case that the secondary side power is supplied only to the secondary side CPU 30, a high voltage is generated on the secondary side because control goes over a limit in PWM control of the DC-DC converter 100.

Further, the secondary side CPU 30 A/D-converts the voltage $V_{DIV}$ divided with the resistors R1 and R2 and transmits a digital signal of the divided voltage $V_{DIV}$ to the primary side CPU 35 through the serial transmitter 55. The primary side CPU 35 determines a high voltage error by determining whether the divided voltage $V_{DIV}$ received is greater than a predetermined value. The high voltage error can be detected without the feedback winding $L_F$ by using the divided voltage $V_{DIV}$ for feedback control of the secondary side voltage. However, to transmit the divided voltage $V_{DIV}$, it is necessary to use an A/D converter (not shown) and the serial transmitters 50 and 55. Thus, a transmitting speed is low, which results in delay in the switching operation. Accordingly, a feedback control using the feedback wiring LF is preferable.

The primary side CPU 35 stops the switching operation of the DC-DC converter by inverting the logic level of the RUN terminal of the DC-DC converter 100. The time interval necessary for completely stopping of the driving operation of the DC-DC converter 100 is 200 msec, which is sufficient for continuing the operation of the secondary CPU 30.

When the driving of the DC-DC converter 100 is stopped, the secondary side voltages (voltage across both terminals of C1, C2, and C3) gradually decrease. However, the time interval from when the error of the primary side CPU 35 is detected to when driving the DC-DC converter 100 is stopped can be set by using a program in the primary side CPU 35, so that the time interval can be optionally changed.

Next, with reference to a flowchart in FIG. 3 and a timing chart in FIG. 4 will be described operation in a case where the capacitor C4 (see FIG. 2) short-circuits. The routine shown in FIG. 3 is periodically executed. In FIG. 4, in a normal status before time t0, the rated voltage of +15V is outputted at the VDD terminal, and a predetermined voltage is outputted at the FB terminal, and the high level is outputted at the COMP terminal (high level in a step S10 in FIG. 3). In this condition, the primary side CPU 35 makes the logic level of the RUN terminal high (step S30), so that the FET performs the switching operation. The processing returns to the original routine (RETURN in FIG. 3).

If the capacitor C4 short-circuits at time t0, a logic level of the FB terminal transients from the high level to the low level. This causes the PWM control signal to have a maximum duty ratio, so that an excessive voltage is developed at the battery voltage detector 20. However, the logic level of the COMP terminal transients to a low logic level (in the step S10, high to low). Then the primary side CPU 35 waits for 200 msec (step S20), and then inverts the logic level at the RUN terminal at time t1 to have a logic low level (step S40). This stops the switching operation of the FET (see FIG. 2). Discharge in the capacitors C1, C2, and C3 decreases the voltage of the VDD terminal toward zero volts. In this operation, the level of the COMP terminal is kept low (low in the step S10), the level of the RUN terminal is kept low (step S40). The processing returns to the original routine (RETURN in FIG. 3).

Further, when transmission of the serial transmitter 55 stops for a predetermined interval or more, the primary side CPU 35 determines that the error occurs and stops the drive of the DC-DC converter 100.

Modifications

The present invention is not limited to the first embodiment, but there are various modifications. In the first embodiment, a flyback type of DC-DC converter is used. However, a DC-DC converter of a forward type can be used.

Second Embodiment

Figure 5:
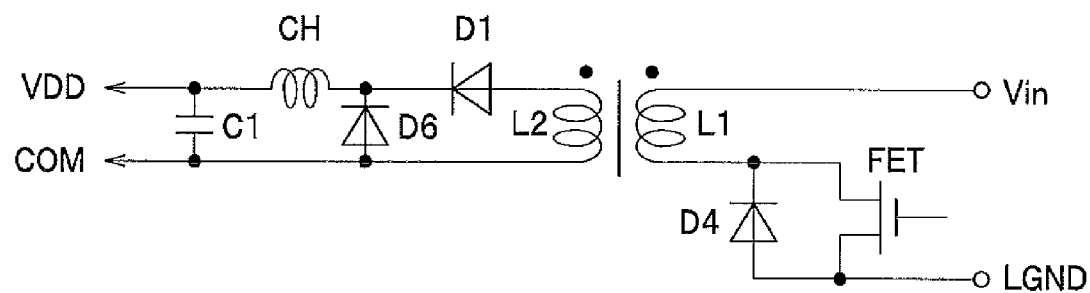
FIG. 5 is a schematic circuit diagram of a forward type of DC-DC converter according to a second embodiment.

In the forward type of DC-DC converter according to a second embodiment, a choke coil, a load resistor, and a smoothing capacitor generates a DC voltage of which DC voltage is determined by a duty ratio. FIG. 5 is a partial circuit diagram of the DC-DC converter of the DC-DC converter. The secondary circuit including the secondary winding L2 is modified. Other secondary circuits including secondary windings L3, and L4, and feedback winding LF are similarly modified and the primary side is similar to that shown in FIG. 2. On the secondary side, one end of the secondary winding is connected to the anode of the diode D1 of which cathode is connected to one end of a choke coil CH. The other end of the choke coil CH is connected to one end of the capacitor C1 of which level is outputted at the VDD terminal. Further, the other end of the secondary winding is connected to the other end of the capacitor C1 of which level is outputted at the COM terminal and to an anode of a diode D6 of which cathode is connected to a junction between the cathode of the diode D1 and one end of the choke coil CH.

Further, in the forward type of the DC-DC converter, a maximum value of secondary side rectangular waveform voltage is determined in accordance with a product of the primary side rectangular waveform voltage by the number of turns. Accordingly, although the status of the PWM control is difficult, the maximum output voltage is limited by the primary side rectangular waveform voltage and the number of turns. However, according to the embodiment, when the secondary side rectangular waveform voltage is outputted with amplitude more than the rated value, stopping the switching operation can reduce a time interval for which an excessive voltage more than the rated value is outputted.

Modifications

In the above-mentioned embodiment, the switching driving operation for the FET (see FIG. 2) is stopped when the secondary side voltage is not lower than a predetermined voltage. However, the switching driving operation may be stopped when the secondary side voltage becomes not greater than a setting voltage which is lower than the predetermined voltage. In other words, it is preferable that the switching operation is stopped when the secondary side voltage is outside a predetermined voltage range (after startup).

The invention claimed is:

1. A DC-DC converter comprising:
   a transformer including primary and secondary windings, wherein the secondary windings comprise a power supply winding externally supplying a power, and a feedback winding generating a voltage proportional to voltages induced in the secondary windings;
   a switching element that drives the primary winding;
   a comparator that compares the voltage from the feedback winding with a predetermined voltage to detect that the voltage is outside a predetermined voltage range to output a logic level indicating a high voltage error in the voltage from the feedback winding on a secondary side of the transformer when the voltage from the feedback winding is outside the predetermined voltage range; and a controller that is on a primary side of the transformer and supplied with the logic level and stops a repeated turning-on-and-off switching operation of the switching element when the logic level indicates the high voltage error in the voltage from the feedback winding on the secondary side of the transformer to avoid the high voltage error, wherein the comparator compares the voltage from the feedback winding that is electrically insulated from the power supply winding.

2. The DC-DC converter as claimed in claim 1, wherein the secondary windings comprise a feedback winding generating a voltage proportional to voltages induced in the secondary windings, the DC-DC converter further comprising a feedback circuit comprising a rectifier connected to the feedback winding to rectify the voltage induced in the feedback winding; wherein the controller stops the repeated turning-on-and-off switching operation of the switching element when the rectified voltage is not greater than the predetermined voltage.

3. The DC-DC converter as claimed in claim 1, further comprising a rectifying circuit that rectifies a voltage induced in the secondary circuit and a secondary voltage detector that is driven by the induced voltage and detects the rectified voltage, wherein the controller stops switching operation of the switching element after a predetermined time interval elapses from when the rectified voltage is not smaller than a predetermined voltage.

4. The DC-DC converter as claimed in claim 1, further comprising a secondary voltage detector that rectifies a voltage induced in the secondary winding and detects the rectified voltage and transmits a signal indicating the detected voltage, wherein the controller is electrically isolated from the secondary voltage detector and has a receiving circuit that receives the signal and causes the switching element to stop driving the primary winding with the switching element when the receiving circuit does not receive the signal for a predetermined time interval.

5. The DC-DC converter as claimed in claim 1, further comprising a secondary output circuit connected to the secondary winding, wherein winding directions of the primary and secondary windings and configuration of the output circuit are determined such that the secondary output circuit and the secondary winding are configured to form a flyback circuit.

6. A voltage detecting apparatus comprising:

a high voltage battery including a plurality of battery cells connected in series, which are grouped into modules each including a predetermined number of the cells;

a battery voltage detecting unit that detects voltages of the modules and transmits a signal indicating the detected voltages;

a signal processing unit that is supplied with electric power from a low voltage battery and processes the signal;

a DC-DC converter that boosts up a voltage of the low voltage battery through a repeated turning-on-and-off to apply the boosted voltage to the battery voltage detecting unit, the DC-DC converter further comprising a transformer including primary and secondary windings, wherein the secondary windings comprise a power supply winding externally supplying a power, and a feedback winding generating a voltage proportional to voltages induced in the secondary windings;

a detector comprises a comparator that compares the generated voltage from the feedback winding with a threshold voltage to detect that the voltage is outside a predetermined voltage range to detect an error in the voltage detecting apparatus and output a logic level indicating a high voltage error in the voltage from the feedback winding on a secondary side of the transformer when the voltage from the feedback winding is outside the predetermined voltage range; and a controller that is on a primary side of the transformer and supplied with the logic level and stops the repeated turning-on-and-off operation of the DC-DC converter when the logic level indicates the high voltage error in the voltage from the feedback winding on the secondary side of the transformer to avoid the high voltage error, wherein the comparator compares the voltage from the feedback winding that is electrically insulated from the power supply winding.

7. The voltage detecting apparatus as claimed in claim 6, wherein the DC-DC converter comprises a primary circuit performing the repeated turning-on-and-off switching operation and a secondary circuit including a feedback winding generating a voltage proportional to a secondary winding voltage in magnitude, the detector detects the error when the voltage exceeds a threshold voltage, and the controller stops the repeated turning-on-and-off switching operation of the primary circuit when the detector detects the error.

8. The DC-DC converter as claimed in claim 1, wherein the output of the comparator is non-proportional to the voltages induced in the secondary windings.

9. The voltage detecting apparatus as claimed in claim 6, wherein the output of the comparator is non-proportional to the voltages induced in the secondary windings.

* * * * *